(12) United States Patent
Alakoski et al.

(10) Patent No.: US 7,391,724 B2
(45) Date of Patent: Jun. 24, 2008

(54) SYSTEM AND METHOD WITH POLICY CONTROL FUNCTION FOR MULTIMEDIA BROADCAST/MULTICAST SYSTEM SERVICES

(75) Inventors: Timo Alakoski, Helsinki (FI); Jorma Sarja, Espoo (FI); Tuija Hurtta, Espoo (FI); Ralitsa Gateva, Kirkland, WA (US)

(73) Assignee: Spyder Navigations, L.L.C., Wilmington, DE (US)

( * ) Notice: Subject to any disclaimer, the term of this patent is extended or adjusted under 35 U.S.C. 154(b) by 1078 days.

(21) Appl. No.: 10/438,812

(22) Filed: May 16, 2003

(65) Prior Publication Data

US 2004/0073928 A1 Apr. 15, 2004

Related U.S. Application Data

(60) Provisional application No. 60/416,894, filed on Oct. 9, 2002.

(51) Int. Cl.
 *H04H 1/04* (2006.01)
(52) U.S. Cl. ............... 370/230; 370/312; 455/433; 455/436; 455/453; 725/62; 725/118
(58) Field of Classification Search ............... 370/230
 See application file for complete search history.

(56) References Cited

U.S. PATENT DOCUMENTS

| | | | |
|---|---|---|---|
| 6,081,705 A * | 6/2000 | Houde et al. ............... 455/411 |
| 6,233,618 B1 | 5/2001 | Shannon |
| 6,434,141 B1 | 8/2002 | Oz et al. |
| 6,621,793 B2 * | 9/2003 | Widegren et al. ........ 370/230.1 |
| 2002/0003789 A1 | 1/2002 | Kim et al. |
| 2002/0114305 A1 * | 8/2002 | Oyama et al. ............... 370/338 |
| 2002/0176377 A1 | 11/2002 | Hamilton |
| 2003/0027595 A1 * | 2/2003 | Ejzak ........................ 455/560 |
| 2003/0035401 A1 * | 2/2003 | Shaheen et al. ............. 370/341 |
| 2003/0076804 A1 | 4/2003 | Sivalingham |
| 2003/0174645 A1 | 9/2003 | Paratainen et al. |
| 2005/0071455 A1 * | 3/2005 | Collins ........................ 709/223 |

FOREIGN PATENT DOCUMENTS

WO    WO 2001/19031    3/2001

OTHER PUBLICATIONS

3GPP TS 22.233 v5.0.0, 3rd Generation Partnership Project;Technical Specification Group Services and System Aspects; Transparent End-to-End Packet-switched Streaming ServiceStage 1 (Release 5), Mar. 2002.*

(Continued)

*Primary Examiner*—Hassan Kizou
*Assistant Examiner*—Jeffrey M Rutkowski (57) ABSTRACT

A system and method with policy control function (PCF) for multimedia broadcast/multicast system (MBMS) services that includes a core network, one or more application servers, and one or more policy control functions (PCF). In one embodiment, the core network includes one or more gateway GPRS support nodes (GGSN). One of the application servers provides a MBMS service. At least one policy control function is operatively connected between each GGSN and application server. MBMS session request information is sent from the MBMS service server to the policy control function. The policy control function provides authorization information for a MBMS session to the GGSN.

77 Claims, 9 Drawing Sheets

OTHER PUBLICATIONS

3GPP TS 23.207 v5.0.0, 3rd Generation Partnership Project; Technical Specification Group Services and System Aspects; End-to-End QoS Concept and Architecture (Release 5), Jun. 2001.*

3GPP TR 23.917, 3rd Generation Partnership Project; Technical Specification Group Services and System Aspects; Dynamic Policy control enhancements for end-to-end QoS (Release 6), Sep. 2002.*

3GPP TS 29.207, 3rd Generation Partnership Project; Technical Specification Group Core Network; Policy control over Go interface (Release 5), Jun. 2002.*

3GPP TR 23.846, 3rd Generation Partnership Project; Technical Specification Group Services and System Aspects; Multimedia Broadcast/Multicast Service; Architecture and Functional Description (Release 6), Jan. 2002.*

Chan et al., COPS Usage for Policy Provisioning (COPS-PR), RFC 3084, Mar. 2001.*

3rd Generation Partnership Project; Technical Specification Group Services and System Aspects; Multimedia Broadcast/Multicast Service (MBMS); Architecture and Functional Description (Release 6), 3GPP TS 23.246, V.O.5.0 (Apr. 2003), pp. 1-23.

International Search Report for PCT/IB03/04446 dated Jul. 2, 2004.

Supplementary European Search Report for EP 03 74 8428, dated Mar. 1, 2007.

"Universal Mobile Telecommunication System (UMTS)" ETSI TS 122 146 V5.2.0, Mar. 1, 2002, pp. 1-15.

* cited by examiner

SYSTEM AND METHOD WITH POLICY CONTROL FUNCTION FOR MULTIMEDIA BROADCAST/MULTICAST SYSTEM SERVICES

This application claims the benefit of U.S. Provisional Patent Application No. 60/416,894, filed Oct. 9, 2002, the contents of which is expressly incorporated by reference herein in its entirety.

BACKGROUND OF THE INVENTION

1. Field of the Invention

This invention relates to wireless communications, and more specifically to using a policy control function (PCF)/policy decision function (PDF) for multimedia broadcast/multicast system services (MBMS).

2. Background of the Related Art

Conventional wireless communication systems suffer from the problem of static, limited traffic classification capability. A Quality of Service (QoS) control may be provided through QoS profiles contained in a Home Location Register (HLR) of the system. This has the disadvantage that the network applies the same HLR based QoS for all communication services. Such static HLR based control is not service-aware. It is not possible to achieve differentiated treatment for different types of service usage within one traffic class and the network is sufficient only for short-term simple communication services.

The $3^{rd}$ Generation Partnership Project (3GPP) has attempted to provide for policy based admission control in Release 5 of the 3GPP TR 23.917 specifications "Dynamic Policy control enhancements for end-to-end QoS", the contents of which are incorporated by reference herein. The specifications include a Policy Control Function (PCF), which although a separate logical entity from the Proxy Connection State Control Function (P-CSCF), is described as being a part of the P-CSCF in Release 5. Consequently, policy based admissions control is only available for communication services provided through the IP multimedia subsystem (IMS) and only the IMS may request resources of the radio access network (for example, Global System for Mobile Communications (GSM) or Universal Mobile Telecommunications System (UMTS)) for the communication services.

In Release 5 of the 3GPP TR 23.917 specifications, a policy control function is only applicable for IMS and tightly linked to the Session Initiation Protocol (SIP) session control. This does not enable a generic service policy to be applied to both IMS and non-IMS services, such as multimedia broadcast/multicast system (MBMS) service.

Moreover, the QoS authorization phase in some current methods only work with MBMS multicast mode. In MBMS multicast mode the mobile device (i.e., User Equipment (UE), Mobile Station (MS), Mobile Node (MN), etc.) must send an IGMP Join message to the Gateway GPRS Service Node (GGSN) to indicate its wish to join to a multicast service. This Join message will then initiate the QoS authorization procedure, i.e. the COPS REQ (Common Open Policy Service Request) message to the PCF to exchange the handle. With MBMS broadcast the UE does not send an IGMP Join message. Therefore, the QoS authorization phase must be initiated by the Broadcast/Multicast-Service Center (BM-SC).

SUMMARY OF THE INVENTION

The present invention relates to a system and method with policy control function (PCF) for multimedia broadcast/multicast system (MBMS) services that includes a core network, one or more application servers, and one or more policy control functions (PCF). The core network includes one or more gateway GPRS support nodes (GGSN). One of the application servers provides a MBMS service. At least one policy control function is operatively connected between each GGSN and application server. MBMS session request information is sent from the MBMS service server to the policy control function. The policy control function provides authorization information for a MBMS session to the GGSN.

The present invention further relates to a method for using PCF with MBMS broadcast services that includes: sending a start message from a broadcast/multicast service center (BM-SC) to a policy control function (PCF); initiating a QoS authorization procedure; sending a request by a GGSN for the PCF to authorize resources for a service; authorizing the resources by the PCF, the PCF sending a first message to the GGSN to transmit MBMS broadcast service attributes; propagating the broadcast service attributes by the GGSN to other network nodes; receiving an acknowledge message of the propagating at the GGSN, the GGSN sending a second message to the PCF; confirming to the BM-SC by the PCF that the resources are allocated and active; and sending broadcast service data packets by the BM-SC.

Moreover, the present invention also relates to a method for controlling QoS for MBMS by a PCF that includes: sending a Session Start message by a BM-SC when it is ready to send MBMS data; determining, by a PCF, GGSN addresses specifying a MBMS service associated with the MBMS data; and sending a Session Start message including QoS information, by the PCF, to all GGSNs whose address was determined.

In addition, the present invention relates to a method for controlling QoS for MBMS by a PCF that includes: creating an MBMS bearer context in a GGSN; sending a notify message to a PCF by the GGSN notifying the PCF of the MBMS bearer context; storing information to identify a MBMS service associated with the MBMS bearer context and a GGSN address and acknowledging the notify message, by the PCF; sending a Session Start message by a BM-SC when the BM-SC is ready to send MBMS data; determining, by the PCF, GGSN addresses of the GGSNs which notified the PCF when the MBMS bearer context was created; and sending a Session Start message by the PCF to all GGSNs whose address was determined, the Session Start message including QoS information.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the present invention can perform policy control functions for various different IMS and non-IMS communication services. In particular, they can provide separate control functions for the various services using a PCF with additional capabilities (an enhanced PCF). The MBMS services can be one of those non-IMS services benefiting from the functionalities of the enhanced PCF. The Policy Control Function (PCF) is also currently known as the Policy Decision Function (PDF). Therefore, according to the present invention, the terms PCF and PDF refer to the same entity, but for consistency purposes, only the term PCF will be used to illustrate a PCF/PDF in embodiments of the present invention.

The $3^{rd}$ Generation Partnership Project is currently developing Release 6 of their specifications. It has also been proposed to have a Broadcast/Multicast-Service Center (BM-SC) connected directly to the GGSN. Such a proposed BM-SC would store the QoS information and control and authorize a MBMS bearer based on the stored QoS information. This proposal would require introducing a new MBMS Service Management function in the BM-SC.

The Gateway GPRS Service Node (GGSN) initiates policy requests at packet data protocol (PDP) context activation or modification. For QoS control of a PDP context, the PCF sends an indication of the maximum allowable QoS for the PDP context.

According to embodiments of the present invention, the enhanced PCF can provide QoS authorization and access control for an MBMS session. The enhanced PCF can perform this authorization based on the information provided by the BM-SC and operator policy stored in the enhanced PCF. According to embodiments of the present invention, the BM-SC may be connected to the enhanced PCF rather than to the GGSN.

The BM-SC can communicate all of the necessary information regarding the MBMS sessions to the enhanced PCF as service attributes (i.e., service area and, for each stream, target QoS and packet filter, etc.). The BM-SC can provide this information to the enhanced PCF in advance or, alternatively, the enhanced PCF can obtain it based on a GGSN request message.

Consequently, the enhanced PCF can provide, to the GGSN, the authorized QoS information for the MBMS session and subscription authorization for a mobile device (e.g., User Equipment (UE), mobile node, mobile station (MS), etc.) requesting the MBMS session. The MBMS service parameters can be used in the GGSN for setting the accurate QoS profile for the MBMS bearer (i.e., mobile device).

The use of the PCF functionality for MBMS according to the present invention has the advantage of providing the possibility to authorize the MBMS session and the user (i.e., mobile device) requesting it to the network operator. Moreover, it gives the network operator the chance to strictly control the MBMS bearer, and possibly to provide charging coordination as well.

The procedure regarding the MBMS authorization may be similar to the PCF-GGSN signaling flows in the Release 5 specifications. For example, the GGSN requests authorization information from PCF for the MBMS media flows carried by a PDP context.

Additionally, according to embodiments of the present invention, an enhanced PCF can receive and store user service subscription information. If this is performed, the enhanced PCF can decide if the UE is authorized to receive a specific MBMS session or not. The QoS and service specific user authorizations may be combined in one signaling procedure between the enhanced PCF and GGSN.

Figure 1:
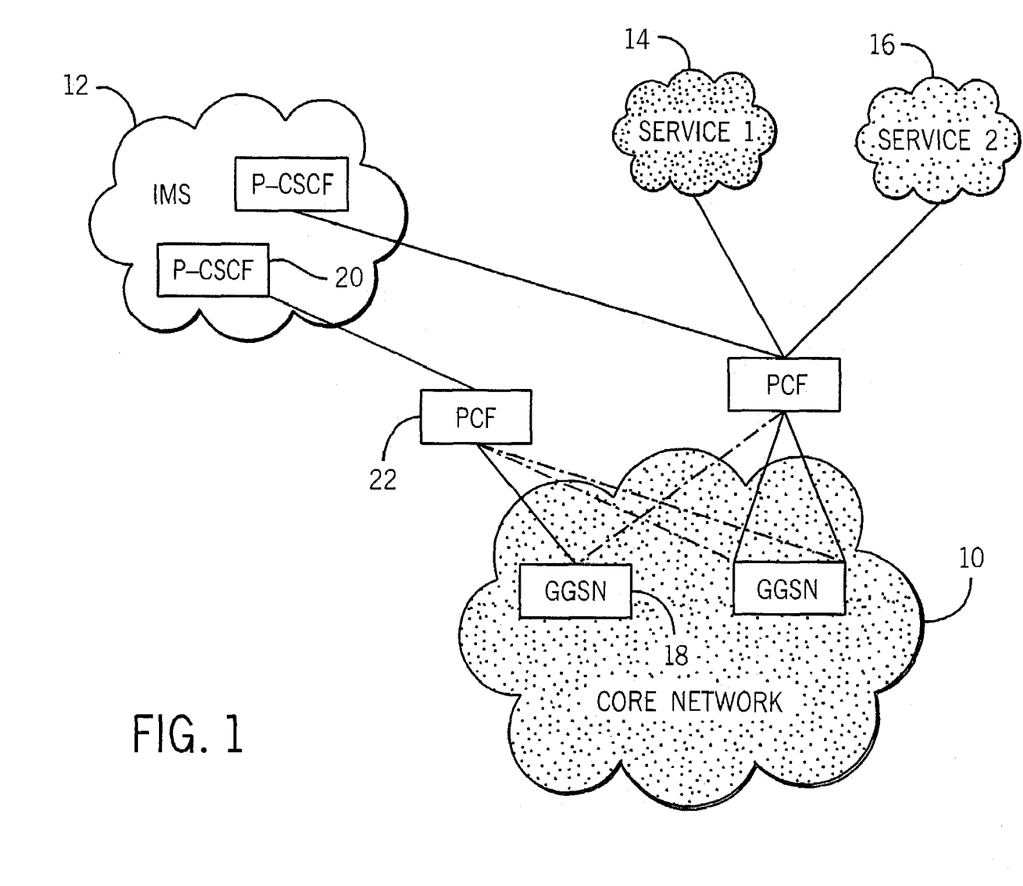
FIG. 1 is a diagram of a system for providing a policy control function (PCF) for IMS services and non-IMS services according to an example embodiment of the present invention.

FIG. 1 shows a diagram of a system for providing a policy control function (PCF) for IMS services and non-IMS services according to an example embodiment of the present invention. The system may include a core network 10, an IP multimedia subsystem (IMS) 12, one or more application servers providing a service 14, 16, and one or more policy control function (PCF) 22. The policy control function 22 may reside at a server or any other type network device. The policy control function 22 may be connected to the application servers 14, 16 using, for example, a Gq interface, or any other type interface that allows the appropriate signalling, control, and data to be passed between these two functions. The core network 10 may include one or more gateway GPRS support node (GGSN) 18. The system also may include one or more policy control function 22 that are operatively connected between the GGSN 18 and the at least one application server 14, 16.

The policy control function 22 may be connected to the GGSN 18 using, for example, a Go interface, a Gi interface, or any other type interface that allows the appropriate signalling, control, and data to be passed between these two functions. A policy control function may be operatively connected between one or more GGSN and the IMS via one or more proxy call state service control function (P-CSCF) 20 at the IMS. The policy control function 22 may be connected to the P-CSCF 20 using, for example, a Gq interface or any other type interface that allows the appropriate signalling, control, and data to be passed between these two functions. Therefore, the present invention enables a generic service policy to be applied to both IMS and non-IMS services. For example, a generic service policy may be applied to a multimedia broadcast/multicast system (MBMS) service or other type services, for example, a packet-switched streaming service (PSS). A PSS server may be one of the application servers and provide the packet-switched streaming service. The packet control function 22 and the PSS server may transfer session based (audio/video) components or non-session based (discrete media) components between them.

Session request information may be sent from the application services 14, 16 to the policy control function. The policy control function may then provide authorization information for an application service session to the GGSN 18. The authorization information may include, for example, an authorized Quality of Service (QoS), packet filtering, and/or a service area. The session request information may be sent from the application service server 14, 16 to the policy control function 22 in response to a mobile device (not shown) attempting or requesting to join or register with the application service session or in response to a first packet of an application service flow arriving at the GGSN 18 from the application service server. The application service server may send the first packet of an application service flow to the GGSN 18 using, for example, a Gi interface, or any other type interface that allows the appropriate signalling, control, and data to be passed between these two functions. The system may also include a serving GPRS support node (SGSN) (not shown) that receives the request to register the mobile device to the application service session. The SGSN may then send an authorization request to the GGSN 18 to authorize the mobile device for the application service session.

Figure 2:
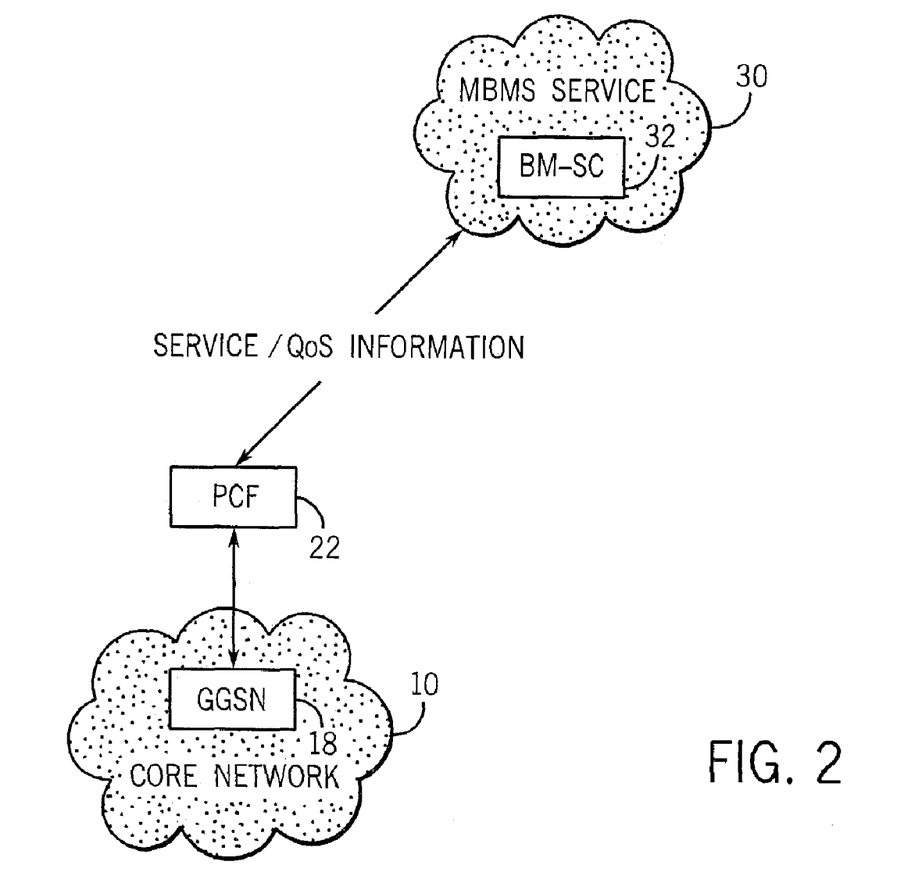
FIG. 2 is a diagram of a system for providing a policy control function (PCF) for multimedia broadcast/multicast system (MBMS) service according to an example embodiment of the present invention.

FIG. 2 shows a diagram of a system for providing a policy control function for multimedia broadcast/multicast system (MBMS) service according to an example embodiment of the present invention. The system may include a core network 10, and an application server providing a MBMS service 30, and one or more policy control function 22. The policy control function 22 may reside at a server or any other type network device. The policy control function 22 may be connected to a broadcast/multicast service center (BM-SC) 32 at the MBMS application server 30 using, for example, a Gq interface, or any other type interface that allows the appropriate signalling, control, and data to be passed between these two functions. The core network 10 may include one or more gateway GPRS support node (GGSN) 18. The policy control function (PCF) 22 may be connected between the GGSN 18 and the broadcast/multicast service center (BM-SC) 32 at the MBMS application server 30.

MBMS session request information may be sent between a MBMS service 30 and the policy control function 22. The policy control function 22 may then provide authorization information for an MBMS session to the GGSN 18. The authorization information may include, for example, an authorized Quality of Service (QoS), packet filtering, and/or a service area. The MBMS session request information may be sent from the MBMS service server 30 to the policy control function 22 in response to a mobile device (not shown) attempting or requesting to join or register with the MBMS session or in response to a first packet of an MBMS media flow arriving at the GGSN 18 from the MBMS service server 30. The MBMS service server 30 may send the first packet of an application service flow to the GGSN 18 using, for example, a Gi interface, or any other type interface that allows the appropriate signalling, control, and data to be passed between these two functions. The system may also include a serving GPRS support node (SGSN) (not shown) that receives the request to register the mobile device to the MBMS service session. The SGSN may then send an authorization request to the GGSN 18 to authorize the mobile device for the MBMS service session.

Figure 3:
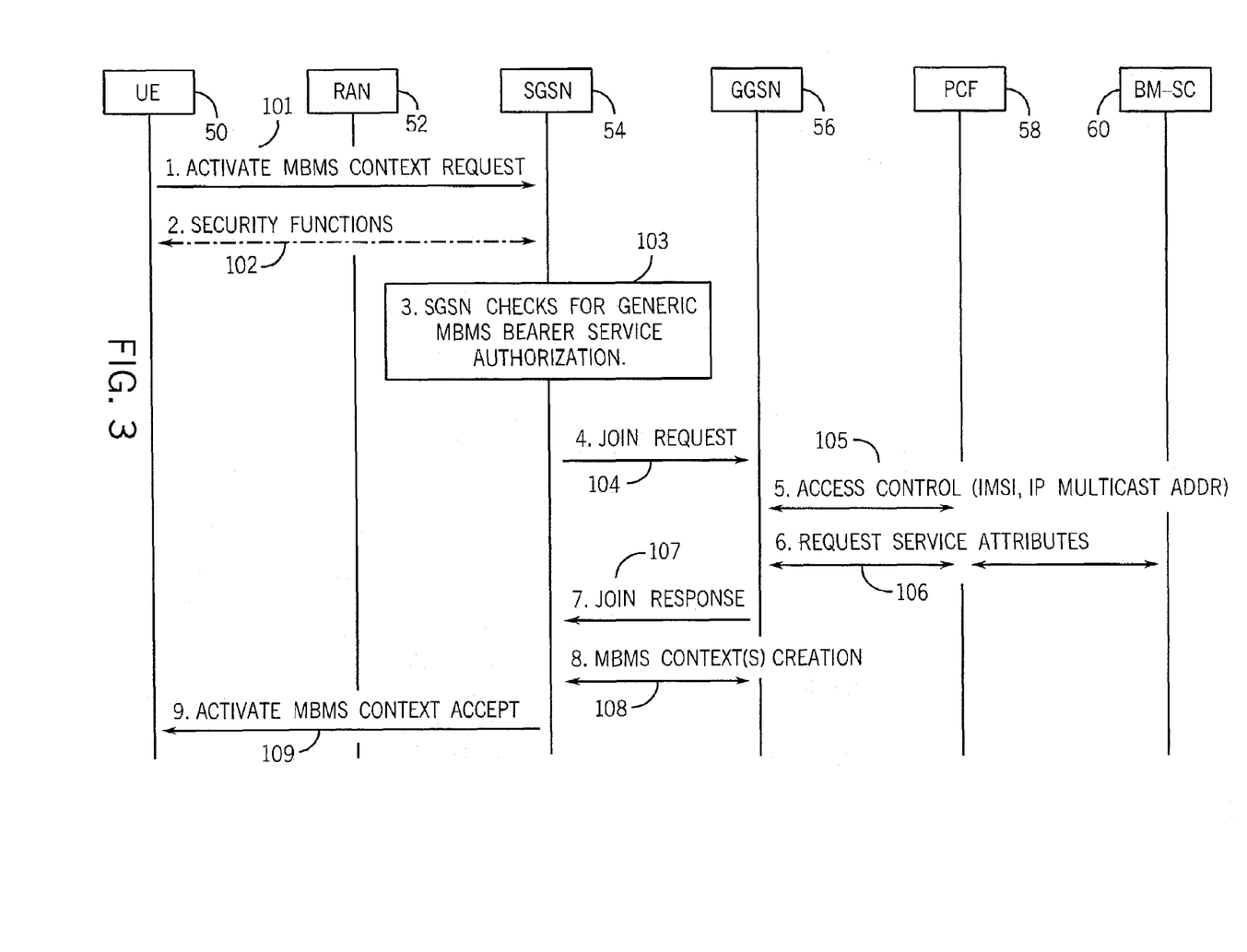
FIG. 3 is a diagram of signaling for activation of a MBMS service according o an example embodiment of the present invention.

FIG. 3 shows a diagram of signaling for activation of a MBMS service according to an example embodiment of the present invention. A request message may be received from a mobile device 50 (e.g., user equipment (UE), mobile station (MS), mobile phone, etc.) at a serving GPRS support node (SGSN) 54 through a Radio Access Node (RAN) 52 to register the mobile device to a specific multicast service, signalling 101. The request message may be in the form of an activate MBMS context request. Security functions may be performed to authenticate the mobile device 50, signalling 102. It may be verified that the mobile device is authorized to receive generic MBMS bearer data or service, 103. The verifying may be based on subscription data retrieved from a Home Location Register (HLR) (not shown) by the SGSN 54.

A join request may be sent from the SGSN 54 to a gateway GPRS support node (GGSN) 56 to authorize the mobile device 50 for the specific multicast service, signalling 104. Access control information may be transferred between the GGSN 56 and a policy control function 58, signalling 105. The access control information may include, for example, an Internet Protocol Multimedia System identifier (IMSI) and an IP multicast address. If the mobile device 50 is the first to activate the specific service, the GGSN 56 may request service attributes from the policy control function 58, signalling 106. The service attributes may include, for example, a Quality of Service (QoS) or a multicast service area. The GGSN 56 may confirm authorization for the mobile device 50 and send a join response to the SGSN 54, signalling 107. The GGSN 56 may join an IP multicast for the IP multicast address to connect with a MBMS data source. MBMS context(s) signalling may be exchanged between the GGSN 56 and the SGSN 54, 108. An activate MBMS context accept may then be sent to the mobile device 50 by the SGSN 54, signalling 109. If the mobile device is the first to activate the specific service, one or more MBMS context may be created by the GGSN based on the access control information.

Figure 4:
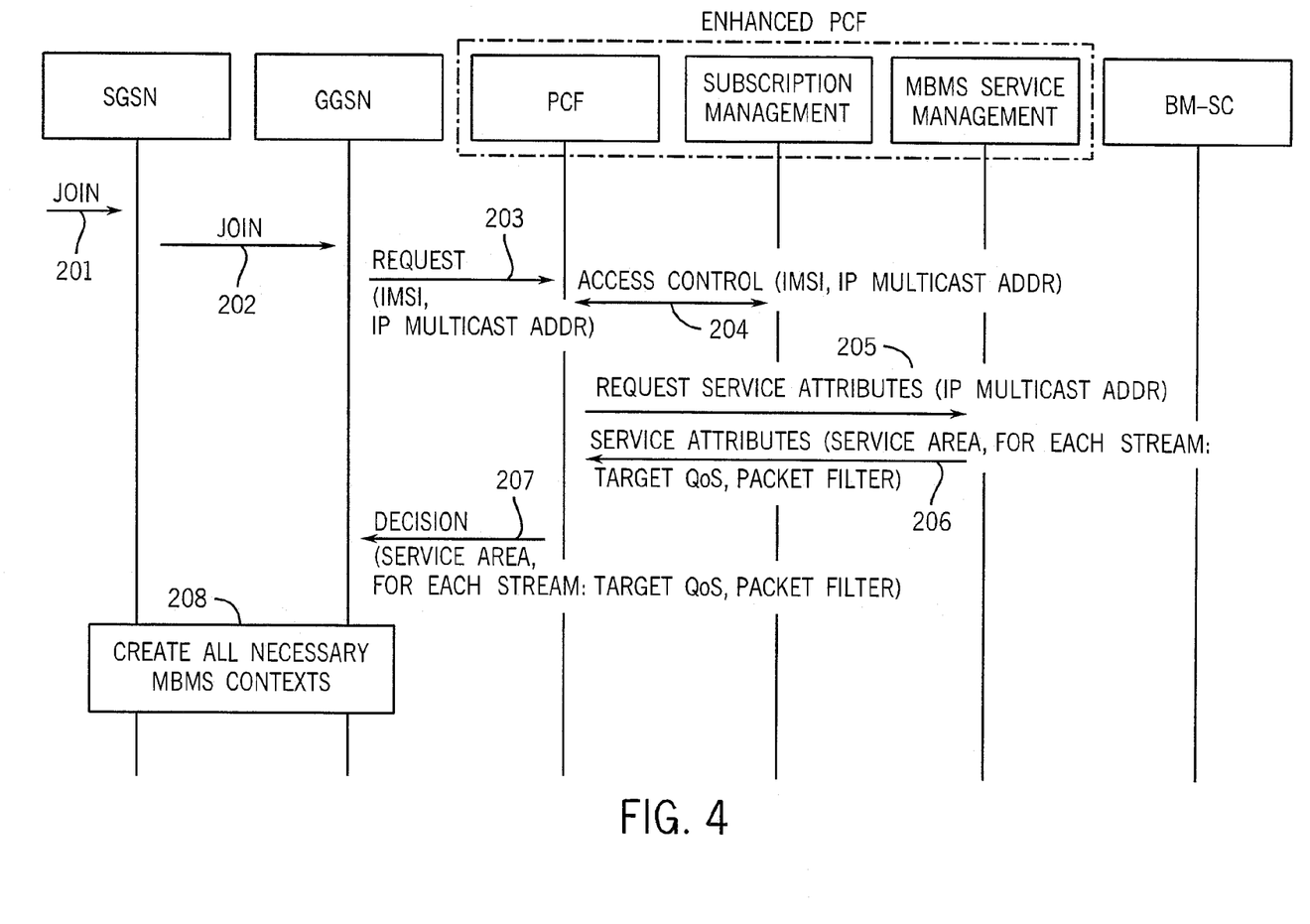
FIG. 4 is a diagram of a signaling for PCF authorization in response to a join request according to an embodiment of the invention.

FIG. 4 shows a diagram of a signaling for PCF authorization in response to a join request according to an embodiment of the invention. A UE join may be provided to a Serving GPRS Service Node (SGSN), signaling 201, and to the GGSN, signaling 202. A request (including information, e.g., a subscriber identifier, such as IMSI, and IP multicast address) may be provided to the PCF function in the enhanced PCF, signaling 203. Access control may be obtained from messages between the PCF function and the Subscription Management function, signaling 204. The PCF function may provide a message to request service attributes (IP multicast address) to the MBMS service management function, signaling 205. The MBMS service management function may return the service attributes (e.g., service area and, for each stream, target QoS and packet filter), signaling 206. The PCF function may pass a message indicating the decision and containing the service attributes to the GGSN, signaling 207. All necessary MBMS contexts may then be created by the SGSN and GGSN, signaling 208.

Figure 5:
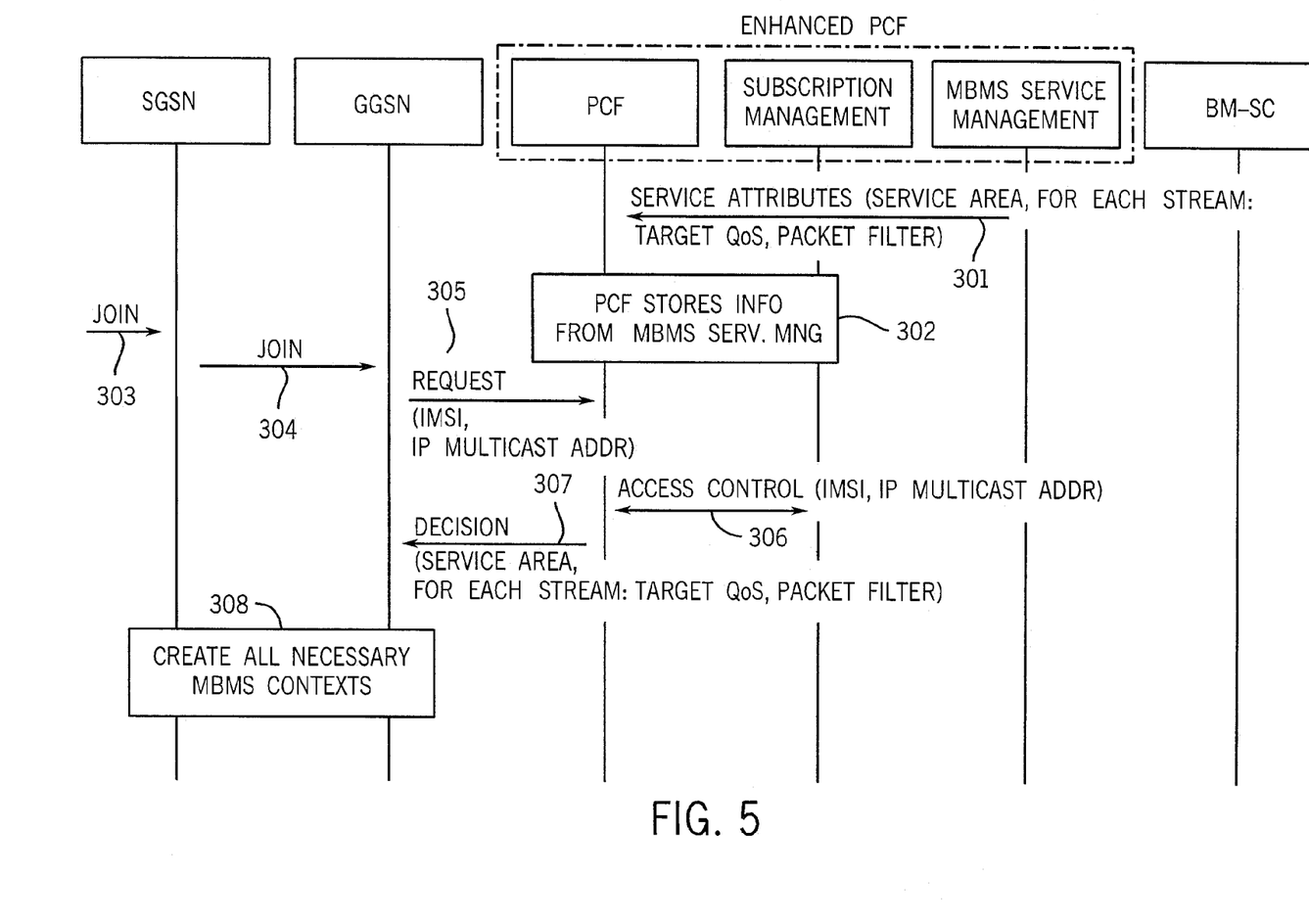
FIG. 5 is a diagram of a signaling for PCF authorization in response to a join request according to an embodiment of the invention in which PCF information is received in advance.

FIG. 5 shows a diagram of a signaling for PCF authorization in response to a join request according to an embodiment of the invention in which PCF information is received in advance. The PCF information including service attributes (e.g., service area and, for each stream, target QoS and packet filter) may be first provided by the MBMS service management function, signaling 301. The PCF function may store the PCF information, signaling 302. A UE join may be provided to the Serving GPRS Service Node (SGSN), signaling 303 and to the GGSN, signaling 304. A Request (including information, e.g., a subscriber identifier, such as IMSI, and IP multicast address) may be provided to the PCF function in an enhanced PCF, signaling 305. Access control may be obtained from messages between the PCF function and a Subscription Management function, signaling 306. The PCF function may pass a message indicating the decision and containing the service attributes to the GGSN, signaling 307. All necessary MBMS contexts may then be created by the SGSN and GGSN, signaling 308.

Figure 6:
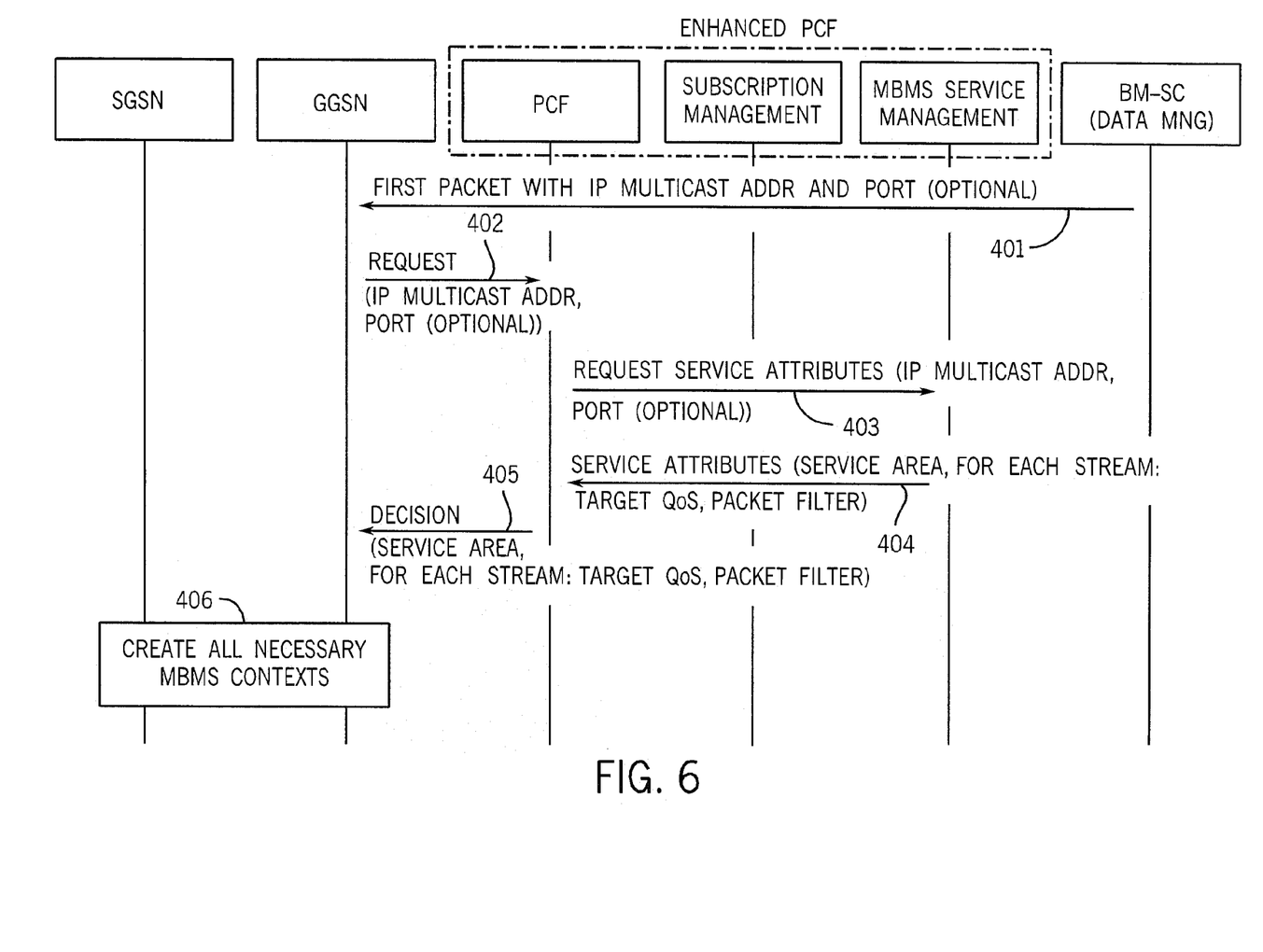
FIG. 6 is a diagram of a signaling for PCF authorization in response to the first packet of a MBMS service from a gateway GPRS serving node (GGSN) according to an embodiment of the invention.

FIG. 6 shows a diagram of a signaling for PCF authorization in response to the first packet of a MBMS service from a gateway GPRS serving node (GGSN) according to an embodiment of the invention. A first packet may be received with an IP multicast address and, optionally, the port identifier, signaling 401. A Request (including information, e.g., a subscriber identifier, such as IMSI, a IP multicast address, a port identifier, etc.) may be provided to a PCF function in an enhanced PCF in response to the packet, signaling 402. The PCF function may provide a message to request service attributes (e.g., IP multicast address, port identifier, etc.) to the MBMS service management function, signaling 403. The MBMS service management function may return the service attributes (e.g., service area and, for each stream, target QoS and packet filter), signaling 404. The PCF function may pass a message indicating the decision and containing the service attributes to the GGSN, signaling 405. All necessary MBMS contexts may then be created by the SGSN and GGSN, signaling 406.

Figure 7:
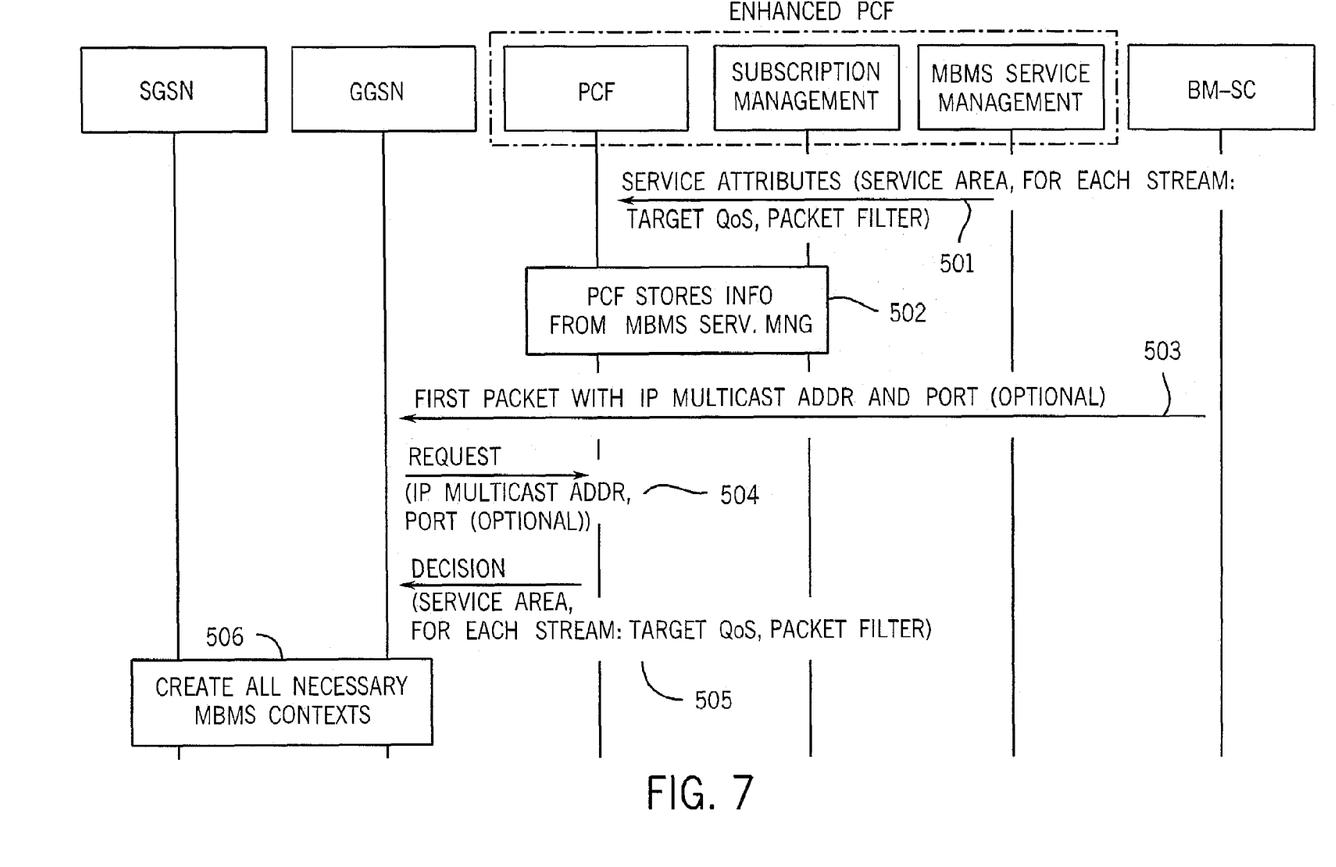
FIG. 7 is a diagram of a signaling for PCF authorization in response to the first packet of a MBMS service from a GGSN according to an embodiment of the invention in which PCF information is received in advance of the first packet.

FIG. 7 shows a diagram of a signaling for PCF authorization in response to the first packet of a MBMS service from a GGSN according to an embodiment of the invention in which PCF information is received in advance of the first packet. The PCF information including service attributes (e.g., service area and, for each stream, target QoS and packet filter) may be first provided by a MBMS service management function, signaling 501. A PCF function may store the PCF information, signaling 502. Then, the first packet may be received with the IP multicast address and, optionally, the port identifier, signaling 503. A Request (including information, e.g., a subscriber identifier, such as IMSI, a IP multicast address, and optionally, a port identifier) may be provided to the PCF function in the enhanced PCF in response to the packet, signaling 504. The PCF function may pass a message indicating the decision and containing the service attributes to the GGSN, signaling 505. All necessary MBMS contexts may then be created by the SGSN and GGSN, signaling 506.

In another embodiment of the present invention, a start notification message from BM-SC to PCF may be used to initiate the QoS authorization and the service activation. This procedure may have two phases: (1) the BM-SC sends start notification message to PCF (like done in MBMS multicast service activation), and (2) the PCF send a COPS-PR DEC message with a Request-State flag set. This will initiate the QoS authorization procedure (as done for MBMS multicast service).

Figure 8:
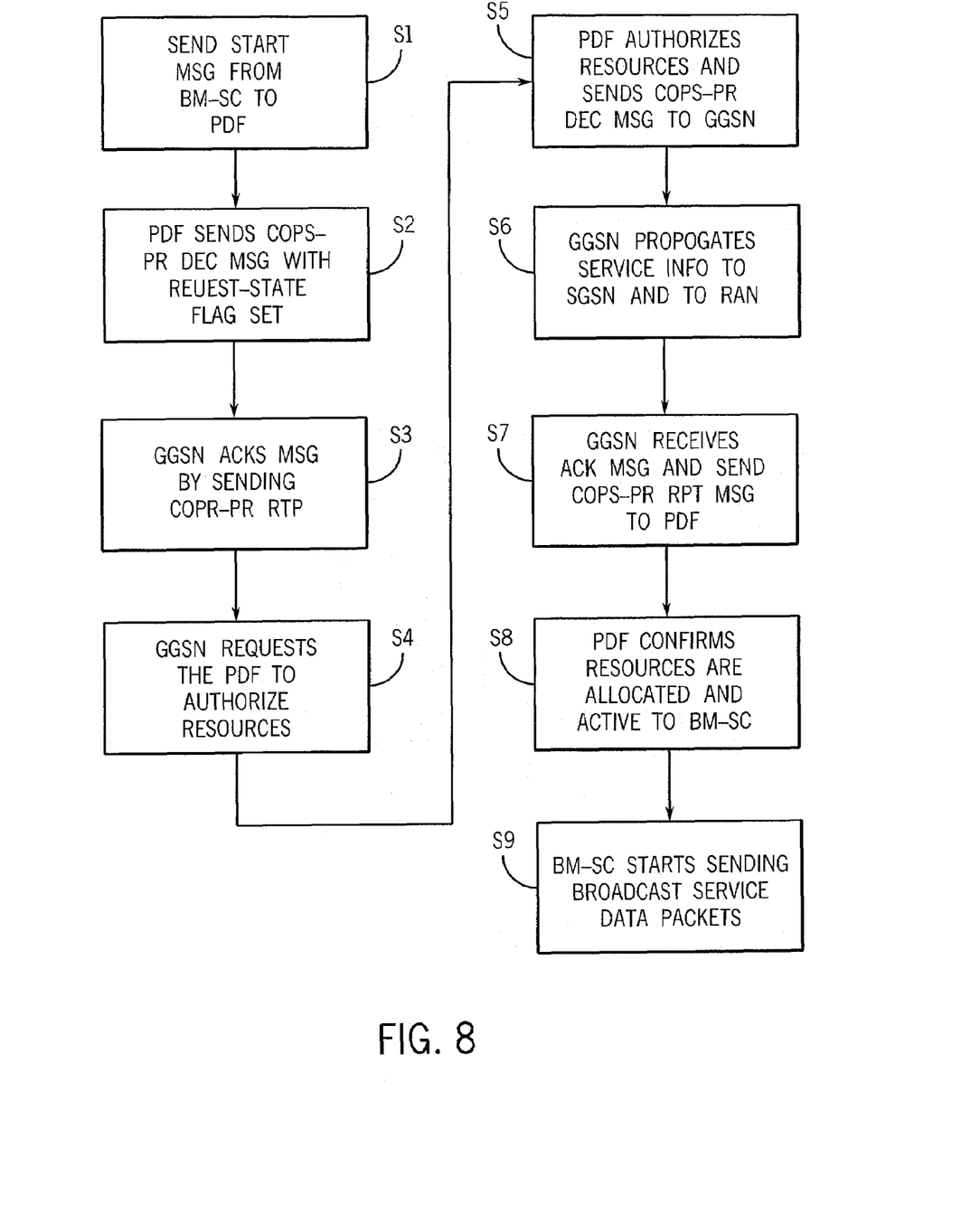
FIG. 8 is a flowchart of a process using PCF with MBMS broadcast services according to an example embodiment of the present invention.

FIG. 8 shows a flowchart of a process using PCF with MBMS broadcast services according to an example embodiment of the present invention. In this example embodiment, the BM-SC may be scheduled to start MBMS broadcast service transmission at a certain time. Thus, the BM-SC sends a Start notification message to the PCF including the same service identifier used with QoS authorization for the service S1. The PCF sends a COPS-PR (Common Open Policy Service-Policy Provisioning) DEC message with a Request-State flag set S2. This initiates the QoS authorization procedure. A service identifier is included to identify the service. The GGSN acknowledges the message by sending a COPR-PR RTP message S3. The GGSN requests the PCF to authorize the resources S4. A service identifier (binding) may be used to identify the service to the PCF. The PCF authorizes the resources and sends a COPS-PR DEC message to the GGSN to transmit the MBMS broadcast service attributes S5. The GGSN propagates the service information to the SGSN and further to the RAN creating also the MBMS contexts S6. The GGSN receives the acknowledge message of the notification, and sends a COPS-PR RPT message back to the PCF, S7. The PCF confirms to the BM-SC that the resources are allocated and active S8. The BM-SC starts sending the broadcast service data packets S9.

In another embodiment of the present invention, solutions are provided to control Quality of Service (QoS) for MBMS by a PCF. In this embodiment, a PCF may send a Session Start message to all GGSNs supporting the MBMS service.

Figure 9:
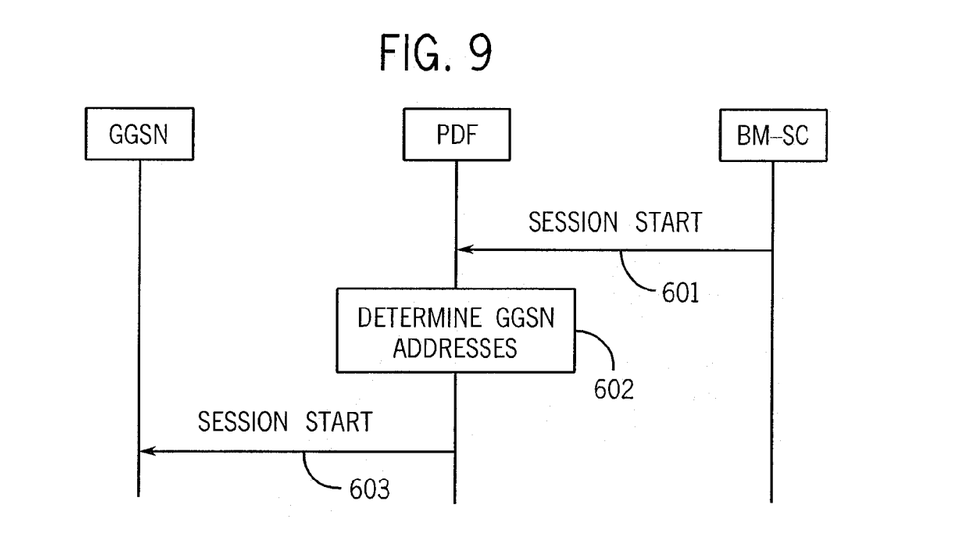
FIG. 9 is a diagram of a signalling for controlling QoS for MBMS by a PCF according to an example embodiment of the present invention.

FIG. 9 shows a diagram of a signalling for controlling QoS for MBMS by a PCF according to an example embodiment of the present invention. The BM-SC sends a Session Start message when it is ready to send MBMS data 601. The PCF determines GGSN addresses with an IP multicast address and Access Point Name (APN) specifying the MBMS service 602. The PCF may receive the IP multicast address and APN from the BM-SC (601) or the IP multicast address and APN may be pre-configured in the PCF. In the latter case, the BM-SC may indicate a service key to identify the MBMS service. With the service key, the PCF can access the pre-configured information. The PCF may receive QoS information from the BM-SC (601) or the QoS information may be pre-configured in the PCF. The PCF sends a Session Start message to all GGSNs whose address was determined previously (602), 603. This Session Start message includes the QoS information. This Session Start message may also include information to identify the MBMS service, e.g., the IP multicast address and APN or the service key.

In the embodiment shown in FIG. 9, a Session Start message is sent to all GGSNs supporting the MBMS service. All those GGSNs may not have stored an MBMS bearer context related to the MBMS service. It is thus possible that the PCF may send a Session Start message to GGSNs not expecting that.

In another embodiment of the present invention, the PCF may send a Session Start message only to those GGSNs storing an MBMS bearer context for the MBMS service. This may require that the GGSN inform the PCF when the MBMS bearer context is created. In this embodiment, the QoS information may be sent in the Session Start message to GGSN(s). As an alternative, the QoS information may be sent already in the Notify Ack. In this case, the GGSN may store the QoS information as part of the MBMS bearer context. There may be no need to send the QoS information in the Session Start message. The Session Start message initiates propagating the QoS information from the GGSN to SGSN(s) and RNC(s).

Figure 10:
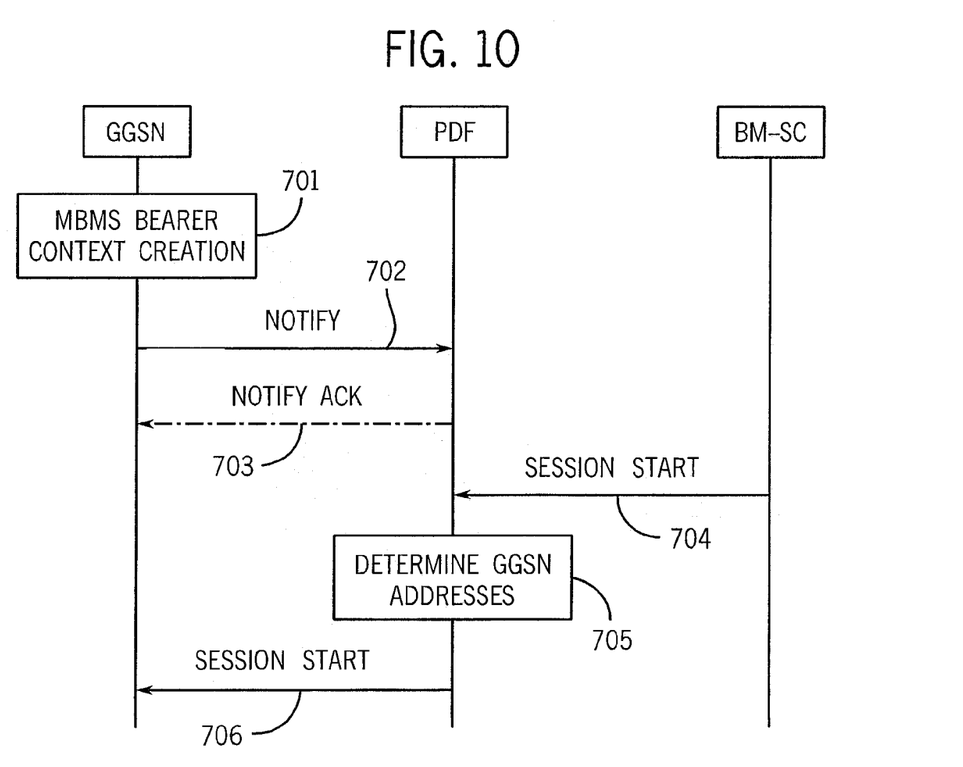
FIG. 10 is a diagram of a signalling for controlling QoS for MBMS by a PCF according to another example embodiment of the present invention.

FIG. 10 shows a diagram of a signalling for controlling QoS for MBMS by a PCF according to another example embodiment of the present invention. An MBMS bearer context is created in the GGSN 701. The GGSN notifies the PCF 702. The Notify message may be, e.g., a COPS Request message. The Notify message may include an IP multicast address and APN or a service key to identify the MBMS service. The PCF may store information to identify the MBMS service (i.e., the IP multicast address and APN or the service key) and the GGSN address and acknowledge the notification 703. The Notify Ack may be optionally used and may be, e.g., a COPS Decision message. The BM-SC sends a Session Start message when it is ready to send MBMS data 704. The PCF may determine GGSN addresses with an IP multicast address and APN or with a service key (i.e., the GGSNs which have notified the PCF when the MBMS bearer context was created) 705. The PCF receives the IP multicast address and APN or the service key from the BM-SC (704). The PCF may receive the QoS information from the BM-SC (704) or the QoS information may be pre-configured in the PCF. The PCF sends a Session Start message to all GGSNs whose address was determined previously (705), 706. This Session Start message includes the QoS information. This Session Start message may also include information to identify the MBMS service, e.g., the IP multicast address and APN or the service key.

The embodiment of the present invention shown in FIG. 10 provides an optimization to the embodiment shown in FIG. 9 by sending a Session Start message only to those GGSNs storing an MBMS bearer context related to the MBMS service and thus requiring the QoS information of the MBMS service.

The present invention is advantageous for several reasons, for example, it enables service based local policy control over IP bearer resources and SIP services to evolve separately, facilitates future application of service based local policy control over IP bearer resources for non-SIP services (e.g., streaming services, etc.) that the operator may want to deploy, improve network scalability/stability by allowing the decoupled PCF and P-CSCF functions to be scaled/upgraded independently according to network requirements, and encourage more flexibility in engineering and policy control of IP bearer resources. This means that policy control mechanisms for IP bearer resources related to SIP and non-SIP-based services, as well as their related IP bearer resources, can be controlled either together or separately.

Moreover, embodiments with policy control function (PCF) for multimedia broadcast/multicast system (MBMS) services according to the present invention allow MBMS broadcast services to be used with PCF. These embodiments allow reuse of the same mechanism as specified for MBMS multicast services and also allows use of an already standardized COPR-PR procedure to send the indication to GGSN create COPS handle for the service. This COPS-PR procedure may not be used with any other services, because the initial policy decision request is initiated always by the GGSN with other services. The broadcast service may be the only service in which the bearer establishment is not based on any user interaction with GGSN.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

We claim:

1. A method for providing a policy control function for multimedia broadcast/multicast system (MBMS) service in a communications network, comprising:
   receiving a request message for a broadcast/multicast system service at a policy control function;
   exchanging messages between the policy control function and a subscription management function to obtain access control;
   sending a message from the policy control function to a MBMS service management function to request service attributes;
   providing the service attributes from the MBMS service management function to the policy control function; and
   sending a decision message from the policy control function containing a decision for the broadcast/multicast system service request.

2. The method according to claim 1, further comprising receiving the request message for the broadcast/multicast system service at the policy control function from a gateway general packet radio service (GPRS) support node (GGSN).

3. The method according to claim 1, further comprising performing a service function to authenticate a mobile device, the mobile device sending the request message for the broadcast/multicast system service.

4. The method according to claim 1, wherein the request message includes an Internet Protocol Multimedia System identifier (IMSI) and an Internet Protocol (IP) multicast address.

5. The method according to claim 1, further comprising joining a MBMS session by a mobile device before the receiving of the request message for the broadcast/multicast system service, the request message being in response to the joining.

6. The method according to claim 1, wherein the decision message comprises Quality of Service (QoS) information for the broadcast/multicast system service.

7. The method according to claim 1, the decision message comprising authorization for the broadcast/multicast system service.

8. A method for providing a policy control function for multimedia broadcast/multicast system (MBMS) service in a communications network, comprising:
   receiving service attribute information from a MBMS service management function;
   storing said service attribute information in a policy control function (PCF);
   receiving a request message for a broadcast/multicast system service at the PCF;
   exchanging messages between the PCF and a subscription management function to obtain access control information; and
   sending a decision message from the PCF containing a decision for the broadcast/multicast system service request.

9. The method according to claim 8, further comprising receiving the request message for the broadcast/multicast system service at the policy control function from a gateway general packet radio service (GPRS) support node (GGSN).

10. The method according to claim 8, further comprising performing a service function to authenticate a mobile device, the mobile device sending the request message for the broadcast/multicast system service.

11. The method according to claim 8, wherein the request message includes an Internet Protocol Multimedia System identifier (IMSI) and an Internet Protocol (IP) multicast address.

12. The method according to claim 8, further comprising joining a MBMS session by a mobile device before the receiving of the request message for the broadcast/multicast system service, the request message being in response to the joining.

13. The method according to claim 8, wherein the decision message comprises Quality of Service (QoS) information for the broadcast/multicast system service.

14. The method according to claim 8, the decision message comprising authorization for the broadcast/multicast system service.

15. A method for providing a policy control function for multimedia broadcast/multicast system (MBMS) service in a communications network, comprising:
 receiving a first packet of a MBMS service at a gateway general packet radio service (GPRS) support node (GGSN) from an application server;
 receiving a request message for the MBMS service at a policy control function;
 sending a message to request service attributes from the policy control function to a MBMS service management function;
 providing the service attributes from the MBMS service management function to the policy control function; and
 sending a decision message from the policy control function containing a decision for the MBMS service request.

16. The method according to claim 15, further comprising receiving the request message for MBMS service at the policy control function from the GGSN.

17. The method according to claim 15, further comprising performing a service function to authenticate a mobile device, the mobile device sending the request message for the MBMS service.

18. The method according to claim 15, wherein the request message includes an Internet Protocol Multimedia System identifier (IMSI) and an Internet Protocol (IP) multicast address.

19. The method according to claim 15, further comprising joining a MBMS session by a mobile device before the receiving of the request message for the MBMS service, the request message being in response to the joining.

20. The method according to claim 15, wherein the decision message comprises Quality of Service (QoS) information for the MBMS service.

21. The method according to claim 15, the decision message comprising authorization for the MBMS service.

22. A method for providing a policy control function for multimedia broadcast/multicast system (MBMS) service in a communications network, comprising:
 receiving, at a policy control function, service attribute information from a MBMS service management function;
 storing the service attribute information at the policy control function;
 receiving a first packet of a MBMS service at a gateway general packet radio service; (GPRS) support node (GGSN);
 receiving a request message for the MBMS service at said policy control function; and
 sending a decision message from the policy control function containing a decision for the MBMS service request.

23. The method according to claim 22, further comprising receiving the request message for the MBMS service at the policy control function from the GGSN.

24. The method according to claim 22, further comprising performing a service function to authenticate a mobile device, the mobile device sending the request message for the MBMS service.

25. The method according to claim 22, wherein the request message includes an Internet Protocol Multimedia System identifier (IMSI) and an Internet Protocol (IP) multicast address.

26. The method according to claim 22, further comprising joining a MBMS session by a mobile device before the receiving of the request message for the MBMS service, the request message being in response to the joining.

27. The method according to claim 22, wherein the decision message comprises Quality of Service (QoS) information for the MBMS service.

28. The method according to claim 22, the decision message comprising authorization for the MBMS service.

29. A communications system comprising:
 a core network, the core network including a gateway general packet radio service (GPRS) support node (GGSN);
 an application server configured to provide a multimedia multicast/broadcast system (MBMS) service; and
 a policy control function (PCF) operatively connected between the GGSN and the application server,
 wherein MBMS session request information is sent from the application server providing the MBMS service to the policy control function, the policy control function providing authorization information for a MBMS session to the GGSN.

30. The system according to claim 29, further comprising a serving GPRS support node (SGSN) and a mobile device, the SGSN receiving a request to register the mobile device to the MBMS session, the SGSN sending an authorization request to the GGSN to authorize the mobile device for the MBMS session.

31. The system according to claim 29, further comprising an IP multimedia subsystem (IMS), wherein the policy control function is operatively connected between the GGSN and the IMS.

32. The system according to claim 31, wherein the IMS further comprises a proxy call state service control function (P-CSCF), wherein the PCF is operatively connected to the P-CSCF.

33. The system according to claim 32, wherein the policy control function is operatively connected to the P-CSCF using a Gq interface.

34. The system according to claim 29, wherein the policy control function is operatively connected to the GGSN using a Go interface.

35. The system according to claim 29, wherein the policy control function is operatively connected to the GGSN using a Gi interface.

36. The system according to claim 29, wherein the policy control function is operatively connected to the application server using a Gq interface.

37. The system according to claim 29, wherein the authorization information comprises at least one of an authorized Quality of Service (QoS), packet filtering, and service area.

38. The system according to claim 29, wherein the MBMS session request information is sent from the application server providing the MBMS service to the policy control function in response to one of a mobile device attempting to join the MBMS session and a first packet of an MBMS media flow arriving at the GGSN from the application server providing the MBMS service.

39. The system according to claim 38, wherein the application server providing the MBMS service sends the first packet of an MBMS media flow to the GGSN using a Gi interface.

40. The system according to claim 29, further comprising a packet-switched streaming service (PSS) server, wherein at least one of session based (audio/video) components and non-session based (discrete media) components are transferred between the packet control function and the PSS server.

41. A method for activation of a multimedia multicast/broadcast system (MBMS) service comprising:
   receiving a request message from a mobile device at a serving general packet radio service (GPRS) support node (SGSN) to register the mobile device to a multicast service;
   verifying the mobile device is authorized to receive MBMS bearer data, the verifying being based on subscription data retrieved from a Home Location Register (HLR) by the SGSN;
   sending a join request from the SGSN to a gateway GPRS support node (GGSN) to authorize the mobile device for the multicast service;
   transferring access control information between the GGSN and a policy control function;
   confirming authorization for the mobile device by the GGSN and sending a join response to the SGSN; and
   sending an activate MBMS context accept to the mobile device by the SGSN.

42. The method according to claim 41, further comprising performing security functions to authenticate the mobile device.

43. The method according to claim 41, further comprising requesting service attributes by the GGSN from the policy control function if the mobile device is first to activate the multicast service.

44. The method according to claim 43, wherein the service attributes comprise at least one of Quality of Service (QoS) and multicast service area.

45. The method according to claim 41, wherein the access control information comprises at least one of an Internet Protocol Multimedia System identifier (IMSI) and an IP multicast address.

46. The method according to claim 45, further comprising joining an IP multicast for the IP multicast address by the GGSN to connect with a MBMS data source.

47. The method according to claim 41, further comprising creating the activate MBMS context by the GGSN based on the access control information if the mobile device is first to activate the multicast service.

48. A method for using policy control function (PCF) with multi-media broadcast/multicast system (MBMS) services comprising:
   sending a start message from a broadcast/multicast service center (BM-SC) to a policy control function (PCF);
   initiating a quality of service (QoS) authorization procedure;
   sending a request by a gateway general packet radio service (GPRS) support node (GGSN) for the PCF to authorize resources for a service;
   authorizing the resources by the PCF, the PCF sending a first message to the GGSN to transmit MBMS service attributes;
   propagating the MBMS service attributes by the GGSN to other network nodes;
   receiving an acknowledge message of the propagating at the GGSN, the GGSN sending a second message to the PCF;
   confirming to the BM-SC by the PCF that the resources are allocated and active; and
   sending broadcast service data packets by the BM-SC.

49. The method according to claim 48, wherein the start message includes a service identifier used with QoS authorization for the service.

50. The method according to claim 48, further comprising initiating the QoS authorization procedure by the PCF sending a COPS-PR (Common Open Policy Service-Policy Provisioning) decision message with a Request-State flag set.

51. The method according to claim 50, wherein a service identifier is included in the COPS-PR decision message to identify the service.

52. The method according to claim 50, further comprising the GGSN acknowledging the COPS-PR message by the GGSN sending a COPS-PR report state message.

53. The method according to claim 48, further comprising sending a service identifier by the GGSN to identify the service to the PCF.

54. The method according to claim 48, wherein the network nodes comprise at least one of a serving general packet radio service (GPRS) support node (SGSN) and a radio access node (RAN).

55. The method according to claim 48, wherein the first message comprises a COPS-PR decision message.

56. The method according to claim 48, wherein the second message comprises a COPS-PR report state message.

57. A method for controlling Quality of service (QoS) for MBMS by a PCF comprising:
   sending a Session Start message by a broadcast/multicast service center (BM-SC) when the BM-SC is ready to send MBMS data;
   determining, by a PCF, GGSN addresses specifying a MBMS service associated with the MBMS data; and
   sending the Session Start message including QoS information, by the PCF, to all GGSNs whose address was determined.

58. The method according to claim 57, wherein the GGSN addresses include an IP multicast address and Access Point Name (APN) specifying the MBMS service associated with the MBMS data.

59. The method according to claim 58, further comprising receiving the IP multicast address and APN from the broadcast/multicast service center (BM-SC) by the PCF.

60. The method according to claim 58, wherein the IP multicast address and APN are pre-configured in the PCF.

61. The method according to claim 60, further comprising indicating a service key to identify the MBMS service by the broadcast/multicast service center (BM-SC), the PCF accessing the pre-configured IP multicast address and APN with the service key.

62. The method according to claim 57, further comprising receiving the QoS information from the broadcast/multicast service center (BM-SC) by the PCF.

63. The method according to claim 57, wherein the QoS information is pre-configured in the PCF.

64. The method according to claim 57, wherein the Session Start message includes information to identify the MBMS service.

65. The method according to claim 64, wherein the information to identify the MBMS service includes at least one of an IP multicast address, an Access Point Name (APN), and a service key.

66. A method for controlling QoS for MBMS by a PCF comprising:
   creating an MBMS bearer context in a GGSN;
   sending a notify message to a PCF by the GGSN notifying the PCF of the MBMS bearer context;
   storing information to identify a MBMS service associated with the MBMS bearer context and a GGSN address and acknowledging the notify message, by the PCF;
   sending a Session Start message by a BM-SC when the BM-SC is ready to send MBMS data;
   determining, by the PCF, GGSN addresses of the GGSNs which notified the PCF when the MBMS bearer context was created; and
   sending the Session Start message by the PCF to all GGSNs whose address was determined, the Session Start message including QoS information.

67. The method according to claim 66, wherein the notify message is a COPS Request message.

68. The method according to claim 66, wherein the notify message includes at least one of an IP multicast address, an APN, and a service key.

69. The method according to claim 66, wherein the information to identify the MBMS service comprises at least one of an IP multicast address, an APN, and a service key.

70. The method according to claim 66, further comprising sending a Notify Ack message from the PCF to the GGSN after receiving the Notify message.

71. The method according to claim 70, wherein the Notify Ack message comprises a COPS Decision message.

72. The method according to claim 66, wherein the GGSN addresses include at least one of an IP multicast address, an APN, and a service key.

73. The method according to claim 66, wherein the PCF receives at least one of an IP multicast address, an access point name (APN), and a service key from the broadcast/multicast service center (BM-SC) in the Session Start message.

74. The method according to claim 66, wherein the PCF receives the QoS information from the broadcast/multicast service center (BM-SC) in the Session Start message.

75. The message according to claim 66, wherein the QoS information is preconfigured in the PCF.

76. The method according to claim 66, wherein the Session Start message includes the information to identify the MBMS service.

77. The method according to claim 76, wherein the information to identify the MBMS service includes at least one of an IP multicast address, an APN, and a service key.

* * * * *